United States Patent [19]

Campbell et al.

[11] Patent Number: 5,593,176

[45] Date of Patent: Jan. 14, 1997

[54] RIDE HEIGHT SETTING BASED ON TRANSFER CASE SETTING

[75] Inventors: Douglas C. Campbell, Dearborn; Gary J. Gloceri, West Bloomfield; Daniel M. McCoy, Shelby Township; Thomas G. Reichenbach, Livonia; Lenard J. Duchnowski, Saline; Jerome C. Ivan, Troy; Joseph M. Raad, Southgate, all of Mich.

[73] Assignee: Ford Motor Company, Dearborn, Mich.

[21] Appl. No.: 357,673

[22] Filed: Dec. 16, 1994

[51] Int. Cl.$^6$ ................................................. B60G 11/26
[52] U.S. Cl. ........................................... 280/707; 280/840
[58] Field of Search ........................... 280/707, 840, 280/6.12

[56] References Cited

U.S. PATENT DOCUMENTS

| | | | |
|---|---|---|---|
| 4,517,832 | 5/1985 | Holland et al. | 73/118 |
| 4,568,093 | 2/1986 | Shimizu et al. | 280/6.12 |
| 4,568,101 | 2/1986 | Bleustein et al. | 280/707 |
| 4,575,115 | 3/1986 | Tatemoto et al. | 280/707 |
| 4,616,847 | 10/1986 | Kanai et al. | 280/707 |
| 4,822,063 | 4/1989 | Yopp et al. | 280/840 |
| 4,865,148 | 9/1989 | Marumoto et al. | 180/141 |
| 5,083,275 | 1/1992 | Kawagoe et al. | 364/424.05 |
| 5,083,454 | 1/1992 | Yopp | 73/118.1 |
| 5,141,245 | 8/1992 | Kamimura et al. | 280/707 |
| 5,297,646 | 3/1994 | Yamamura et al. | 180/142 |
| 5,466,007 | 11/1995 | Smith | 280/707 |
| 5,517,847 | 5/1996 | Campbell et al. | 280/840 |
| 5,555,173 | 9/1996 | Campbell et al. | 280/707 |

Primary Examiner—Paul N. Dickson
Attorney, Agent, or Firm—Roger L. May; Gregory P. Brown

[57] ABSTRACT

In vehicles having drive wheel selections, accessed for example through a transfer case, drive wheel settings are used to determine a desired vehicle ride height at which the vehicle is maintained by a vehicle suspension control system. Preferably, both vehicle speed and transfer case setting are combined to determine the desired vehicle ride height. With two wheel drive selected, the desired vehicle ride height is set to a low ride height which provides the most aerodynamic airflow for the vehicle. However, if four wheel drive is selected, the speed is checked to determine the desired vehicle ride height. If four wheel drive (automatic four wheel drive) is selected, low ride height is still selected for speeds in excess of a first defined speed. For speeds at or below the first defined speed, a high ride height approximately 1 inch above the low ride height is set for the desired ride height. If four wheel drive low is selected, typically in contemplation of off-road operation, a higher still ride height or off-road ride height approximately 1 inch above high ride height is set for the desired ride height.

12 Claims, 2 Drawing Sheets

1

RIDE HEIGHT SETTING BASED ON TRANSFER CASE SETTING

BACKGROUND OF THE INVENTION

The present invention relates in general to motor vehicle suspension systems which include controllable ride height, for example by an air suspension control system, and, more particularly, to ride height control for vehicles having manually and/or automatically selectable drive wheels including at least a two wheel drive setting and a four wheel drive setting.

Motor vehicle suspension systems are connected between the body of the vehicle and the wheels to determine the ride and handling of the vehicle. Conventional suspension systems include springs and shock absorbers which are typically fixed such that the ride and handling are fixed and the level of the vehicle depends upon the loading of the vehicle.

More advanced suspension systems include controllable elements such as variable damping shock absorbers which permit a number of damping factors to be selected as needed. Controllable springs may also be included. Such springs are typically pneumatically or air controlled and are inflated to increase the spring rate of the overall vehicle spring system and deflated to decrease the spring rate. Vehicle suspensions including controllable springs may be electronically controlled to select vehicle ride height relative to the wheels or ground based on the speed of the vehicle. Ride height can therefor be reduced to reduce drag and increase efficient operation at highway speeds and raised to increase clearance at lower speeds and for convenient entry and exit from the vehicle when stopped.

Unfortunately, for vehicles which include automatic and/or manual drive wheel selection including at least a two wheel drive setting and a four wheel drive setting, vehicle height selection based on speed is not entirely satisfactory. It is, thus, apparent that there is a need for an improved suspension control system to better select ride height settings for such vehicles.

SUMMARY OF THE INVENTION

This need is met by the invention of the present application wherein, for vehicles having automatic and/or manual drive wheel selection, the drive wheel selection is utilized to determine a desired vehicle ride height at which the vehicle is maintained by the vehicle suspension control system. In an illustrated embodiment, both drive wheel selection and vehicle speed are combined to determine a desired vehicle ride height. For this embodiment, with two wheel drive selected, the desired vehicle ride height is set to a low ride height which provides the most aerodynamic airflow for the vehicle. However, if four wheel drive is selected, the speed is checked to determine the desired vehicle ride height.

In particular, if four wheel drive (automatic four wheel drive) is selected, low ride height is still selected for speeds in excess of a first defined speed. For speeds at or below the first defined speed, a high ride height approximately 1 inch above the low ride height is set for the desired ride height. If four wheel drive low is selected typically in contemplation of off-road operation, a higher still ride height or off-road ride height approximately 1 inch above high ride height is set for the desired ride height.

In accordance with one aspect of the present invention, a method for controlling the ride height of a vehicle having selectable drive wheels including at least a two wheel drive setting and a four wheel drive setting for the vehicle comprises the steps of: selecting the drive wheel setting of the vehicle; and, selecting a desired vehicle ride height at which the vehicle is maintained based on the drive wheel setting.

In accordance with another aspect of the present invention, a method for controlling the ride height of a vehicle having a transfer case for selecting between at least a two wheel drive setting and a four wheel drive setting for the vehicle comprises the steps of: sensing the drive setting of the transfer box; sensing the speed of the vehicle; and, combining the drive setting of the transfer box and the speed of the vehicle to select a desired vehicle ride height at which the vehicle is maintained.

It is a feature of the present invention to provide an improved ride height control system which utilizes an automatically and/or manually selected wheel drive setting in making ride height decisions; and, to provide an improved ride height control system which includes both vehicle speed and wheel derive setting in making ride height decisions.

Other features and advantages of the invention will be apparent from the following description, the accompanying drawings and the appended claims.

DETAILED DESCRIPTION OF THE INVENTION

Figure 1:
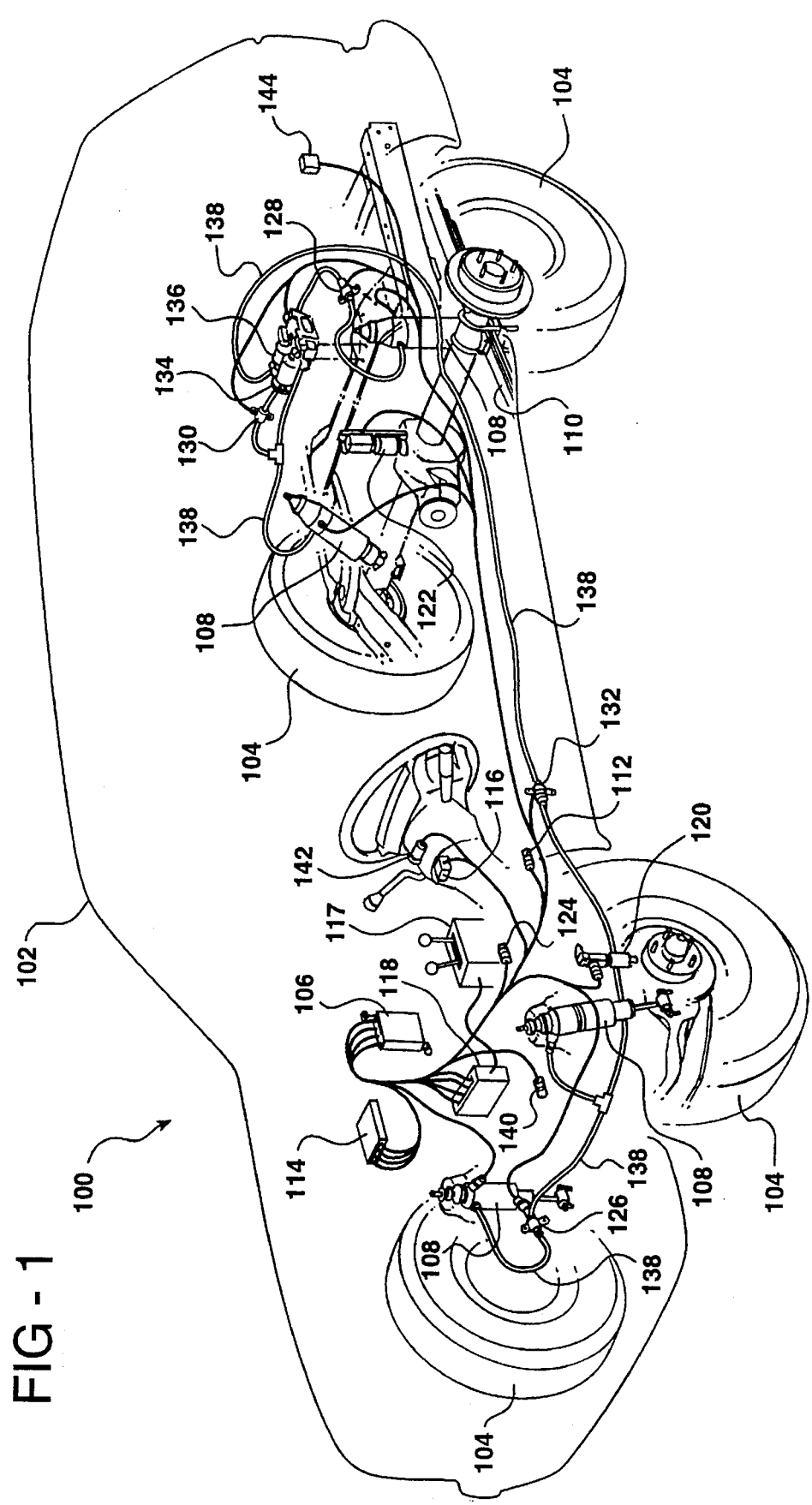
FIG. 1 is a perspective view of a vehicle, with the body shown in outline, including a controllable suspension system operable in accordance with the present invention.

The invention of the present application will be described with reference to a vehicle 100 and, more particularly, to a controllable suspension connected between a body 102 and wheels 104 of the vehicle 100 as illustrated in FIG. 1. The vehicle 100 includes an automatic ride control system having a computer controller 106 which controls the various components of the suspension. The four corners of the vehicle are controlled, in part, by two stage, firm and soft, shock absorbers 108 to provide a smooth ride for normal driving without sacrificing handling performance. An air spring integral with each shock absorber 108 permits load leveling and vehicle height adjustment over a span of approximately 50 mm (2 inches). Of course, air springs and shock absorbers which are separate from one another could be used for the suspension.

A smooth ride is achieved through selection of lower rate front torsion bars, not shown, and rear leaf springs 110, front and rear anti-roll bars, not shown, and selection of soft damping for the shock absorbers 108. Handling performance is maintained by reading driver and road inputs that, under certain conditions, switch the damping rate of the shock absorbers 108 to firm, minimizing body movement. Driver inputs may include: braking, monitored via a brake switch 112; throttle position, monitored via a primary engine control computer 114; steering rate and position, monitored via a steering sensor 116; and, since the illustrated vehicle 100 includes a selectable four wheel drive capability, the setting of a transfer case 117, monitored via an electronic module 118. Road inputs are sensed by a vehicle speed indicator 124 located near an output shaft of a transmission, not shown, of the vehicle 100 and two suspension mounted height sensors, a front height sensor 120 and a rear height sensor 122.

The automatic ride control system controls the height of the vehicle 100 on the front and rear axles separately through the use of an air compressor 136, air lines 138, and five solenoid valves: a front gate solenoid valve 126; a rear gate solenoid valve 128; a rear fill solenoid valve 130; a front fill solenoid valve 132; and, a vent solenoid valve 134. The vent solenoid valve 134 is located in a cylinder head of the air compressor 136. The compressor 136 is controlled via a compressor relay 140.

Enclosed in each of the shock absorbers 108 is an air spring and a mechanism that enables switching between soft and firm damping. The air spring integrated into each of the shock absorbers 108 is capable of independently raising and lowering each corner of the vehicle 100 based on the pressure and volume of air supplied to it. The automatic ride control system regulates the pressure in each air spring by compressing and venting the air provided to it. As earlier noted, the air springs and shock absorbers 108 could be separate from one another. Further, since a variety of mechanisms are known for switching the damping rates of shock absorbers for motor vehicles, the shock absorbers will not be described in detail herein.

The air compressor 136 is connected to the shock absorbers 108 via the solenoid valves 126–132 and the air lines 138. The front shock absorbers 108 are controlled via the front fill solenoid valve 132 and the front gate solenoid valve 126. When the front fill solenoid valve 132 and the front gate solenoid valve 126 are energized, air pressure to the front shock absorbers 108 can be modified. The rear shock absorbers 108 are controlled via the rear fill solenoid valve 130 and the rear gate solenoid valve 128. When the rear fill solenoid valve 130 and the rear gate solenoid valve 128 are energized, air pressure to the rear shock absorbers 108 can be modified. The front and rear gate solenoid valves 126, 128 can be activated to isolate the left side of the vehicle from the right side of the vehicle.

The automatic ride control system is also under the control of a vehicle ignition switch 142 and a suspension control switch 144 which must be turned to the off position when the vehicle 100 is to be hoisted, jacked, towed, jump-started or raised off the ground.

In existing vehicle suspensions including controllable springs such as independent air springs or air springs integral with each shock absorber 108 as illustrated herein, the springs may be electronically controlled to select ride height of the body 102 of the vehicle 100 relative to the wheels 104 based on the speed of the vehicle. Thus, the vehicle ride height is lowered for more efficient highway speed operation and raised for better ground clearance and easier access to the vehicle at lower speeds or while stopped.

The vehicle 100 includes the transfer case 117 which permits the operator of the vehicle 100 to select wheel drive for the vehicle 100. As earlier noted, the settings of the transfer case 117 are monitored via the electronic module 118. The transfer case 117 permits the operator of the vehicle 100 to select, two wheel drive, four wheel drive (automatic four wheel drive) and low four wheel drive. While a manually operated drive wheel selection arrangement is illustrated in the vehicle 100, it is to be understood that the invention of the present application may be used in any vehicle having wheel drive selection whether that selection is automatically or manually performed and whether the drive wheel selection is performed using a transfer case or other arrangement. For vehicles with drive wheel selection, vehicle height settings based on speed are not entirely satisfactory.

This problem is overcome by the ride height control of the present application wherein the drive wheel selection, represented by the settings of the transfer case 117 in the vehicle 100 of the illustrated embodiment, are used to determine the ride height of the vehicle. As illustrated, both the speed of the vehicle 100 and the settings of the transfer case 117 are used to determine the ride height of the vehicle 100.

As previously noted, the air springs in the shock absorbers 108 provide vehicle height adjustment over a span of approximately 50 mm (2 inches). This height adjustment range conveniently defines three height settings for the vehicle 100: a low ride height or aerodynamic (aero) ride height which is the lowest vehicle height defined by the air springs; a high ride height or curb ride height which is approximately 25 mm (1 inch) above the low ride height; and, an off-road ride height which is approximately 25 mm (1 inch) above the high ride height and approximately 50 mm (2 inches) above the low ride height. Of course other adjustment ranges can be provide in the ride height control of the present application as well as additional ride heights as should be apparent.

Figure 2:
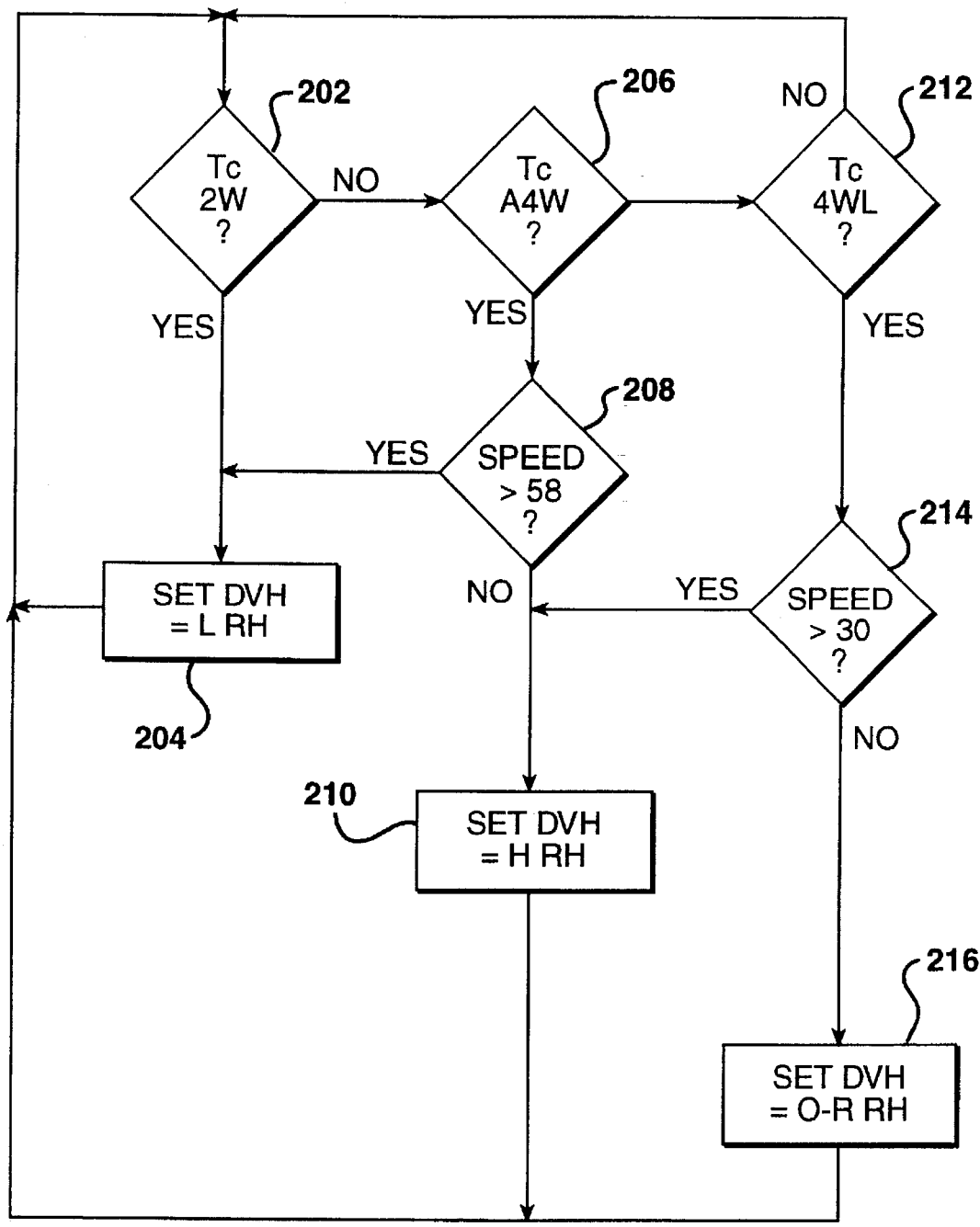
FIG. 2 is a flow chart showing illustrative steps for operation of the invention of the present application.

Ride height control responsive to both vehicle speed and drive wheel setting represented by the setting of the transfer case 117 will now be described with reference to FIG. 2 which is a flow chart 200 showing illustrative steps for operation of the invention. Initially, the setting of the transfer case 117 is checked. If the setting of the transfer case is set to two wheel drive, a desired vehicle ride height (DVH) is set to low ride height (LRH), see blocks 202, 204. If the transfer case 117 is set to either four wheel drive or four wheel drive low, the speed is also considered in determining where to set the desired ride height.

If the transfer case 117 is set to four wheel drive (automatic four wheel drive or A4W), the vehicle speed is checked to determine whether it is greater than a first defined speed, about 58 miles per hour for a working embodiment, see blocks 206, 208. If the vehicle speed is greater than the first defined speed, the desired vehicle height (DVH) is set to low ride height (LRH) as shown in the block 204. If the vehicle speed is less than or equal to the first defined speed, the desired vehicle height (DVH) is set to the high ride height (HRH), see block 210.

If the transfer case 117 is set to four wheel drive low (4WL), the vehicle speed is checked to determine whether it is greater than a second defined speed, about 30 miles per hour for a working embodiment, see blocks 212, 214. If the vehicle speed is greater than the second defined speed, the desired vehicle height (DVH) is set to high ride height (HRH) as shown in block 210. If the vehicle speed is less than or equal to the second defined speed, the desired vehicle height (DVH) is set to off-road ride height (O-RRH), see block 216. The computer controller 106 then maintains the vehicle 100 at the desired ride height.

As illustrated, vehicle height control is based on signals received from the front height sensor 120 and a rear height sensor 122; however, it should be apparent that vehicle ride height control could be based on ground sensing or other suspension sensor arrangements. Since the actual vehicle ride height control forms no part of the present invention, the various control arrangements will not be described in detail herein.

It is noted that it is preferred to delay ride height changes due to transfer case settings and speed for some period or periods of time. The delay or delays avoid unnecessary activations of the suspension system components for transient settings of the transfer case 117 or temporary vehicle speed changes.

Having thus described the invention of the present application in detail and by reference to preferred embodiments thereof, it will be apparent that modifications and variations are possible without departing from the scope of the invention defined in the appended claims.

What is claimed is:

1. A method for controlling the ride height of a vehicle having selectable drive wheels including at least a two wheel drive setting and a four wheel drive setting for said vehicle, said method comprising the steps of:

sensing the speed of the vehicle;

selecting the drive wheel setting of the vehicle; and selecting a desired vehicle ride height at which the vehicle is maintained by combining the drive wheel setting and the speed of the vehicle.

2. A method for controlling the ride height of a vehicle as claimed in claim 1 wherein said step of selecting the drive wheel setting of the vehicle comprises the step of automatically selecting the drive wheel setting of the vehicle.

3. A method for controlling the ride height of a vehicle as claimed in claim 1 wherein said step of selecting the drive wheel setting of the vehicle comprises the step of manually selecting the drive wheel setting of the vehicle.

4. A method for controlling the ride height of a vehicle having selectable drive wheels including at least a two wheel drive setting and a four wheel drive setting for said vehicle and at least two selectable ride heights, a low ride height and a high ride height, said method comprising the steps of:

sensing the speed of the vehicle;

selecting the drive wheel setting of the vehicle; and selecting a desired vehicle ride height at which the vehicle is maintained based on the drive wheel setting by combining the drive wheel setting and the speed of the vehicle by performing the steps of:

setting the desired vehicle ride height to the low ride height for the two wheel drive setting;

setting the desired vehicle ride height to the low ride height for the four wheel drive setting if the speed of the vehicle is greater than a first defined speed; and setting the desired vehicle ride height to the high ride height for the four wheel drive setting if the speed of the vehicle is less than said first defined speed.

5. A method for controlling the ride height of a vehicle as claimed in claim 4 further comprising the step of setting said first defined speed to approximately 58 miles per hour.

6. A method for controlling the ride height of a vehicle as claimed in claim 4 wherein three drive settings, a two wheel drive setting, a four wheel drive setting and a low four wheel drive setting, are selected, three ride heights, a low ride height, a high ride height and an off-road ride height higher than said high ride height, are selected, and said step of combining the drive wheel setting and the speed of the vehicle to select a desired vehicle ride height further comprises the steps of:

setting the desired vehicle ride height to the low ride height for the low four wheel drive setting if the speed of the vehicle is greater than a second defined speed; and setting the desired vehicle ride height to the off-road ride height for low four wheel drive setting if the speed of the vehicle is less than said second defined speed.

7. A method for controlling the ride height of a vehicle as claimed in claim 6 further comprising the step of setting said second defined speed to approximately 30 miles per hour.

8. A method for controlling the ride height of a vehicle having a transfer case for selecting between at least a two wheel drive setting and a four wheel drive setting for said vehicle, said method comprising the steps of:

sensing the speed of the vehicle;

sensing the drive setting of the transfer case; and selecting a desired vehicle ride height at which the vehicle is maintained by combining the drive setting of the transfer case and the speed of the vehicle.

9. A method for controlling the ride height of a vehicle having a transfer case for selecting between at least a two wheel drive setting and a four wheel drive setting for said vehicle and at least two selectable ride heights, a low ride height and a high ride height, said method comprising the steps of:

sensing the speed of the vehicle;

sensing the drive setting of the transfer case; and selecting a desired vehicle ride height at which the vehicle is maintained in response to the drive setting by combining the drive setting of the transfer case and the speed of the vehicle by preforming the steps of:

setting the desired vehicle ride height to the low ride height for the two wheel drive setting of the transfer case;

setting the desired vehicle ride height to the low ride height for the four wheel drive setting of the transfer case if the speed of the vehicle is greater than a first defined speed; and setting the desired vehicle ride height to the high ride height for the four wheel drive setting of the transfer case if the speed of the vehicle is less than said first defined speed.

10. A method for controlling the ride height of a vehicle as claimed in claim 9 further comprising the step of setting said first defined speed to approximately 58 miles per hour.

11. A method for controlling the ride height of a vehicle as claimed in claim 9 wherein said transfer case provides for selecting between a two wheel drive setting, a four wheel drive setting and a low four wheel drive setting, three ride heights, a low ride height, a high ride height and an off-road ride height higher than said high ride height, are selected, and said step of combining the drive setting of the transfer case and the speed of the vehicle to select a desired vehicle ride height further comprises the steps of:

setting the desired vehicle ride height to the low ride height for the low four wheel drive setting if the speed of the vehicle is greater than a second defined speed; and setting the desired vehicle ride height to the off-road ride height for low four wheel drive setting if the speed of the vehicle is less than said second defined speed.

12. A method for controlling the ride height of a vehicle as claimed in claim 11 further comprising the step of setting said second defined speed to approximately 30 miles per hour.

* * * * *